United States Patent [19]

Coffre et al.

[11] Patent Number: 4,836,242
[45] Date of Patent: Jun. 6, 1989

[54] PRESSURE REDUCER FOR PURE GASES

[75] Inventors: Eric Coffre, Trappes; Daniel Gary, Versailles; Christophe di Giulio, Neuilly-sur-Seine; Gérard Loiseau, Bois D'Arcy; Gérard Torelli, Vanves, all of France

[73] Assignee: L'Air Liquide, Paris, France

[21] Appl. No.: 193,076

[22] Filed: May 12, 1988

[30] Foreign Application Priority Data

May 15, 1987 [FR] France .................. 87 06815

[51] Int. Cl.⁴ .................. F16K 31/126; F16K 51/00
[52] U.S. Cl. .................. 137/505.42; 137/505.39; 137/549; 137/550
[58] Field of Search .................. 137/505.42, 505.41, 137/505.39, 505.38, 549, 550

[56] References Cited

U.S. PATENT DOCUMENTS

| | | | |
|---|---|---|---|
| 1,807,200 | 5/1931 | Dennison et al. | 137/505.42 X |
| 2,301,031 | 11/1942 | Ferguson | 137/505.42 X |
| 2,478,040 | 8/1949 | Campbell, Jr. et al. | 137/505.42 X |
| 2,612,728 | 10/1952 | Jacobsson | 137/505.42 X |
| 2,666,278 | 1/1954 | Matasovic | 137/505.42 X |
| 2,981,280 | 4/1961 | Cornelius | 137/505.42 X |
| 3,057,346 | 10/1962 | Goodner | 128/204.27 |
| 3,113,756 | 12/1963 | Griffo | 137/505.42 X |
| 3,200,816 | 8/1965 | Bartlett | 128/204.21 |
| 3,357,428 | 12/1967 | Carlson | 128/204.23 |
| 3,863,630 | 2/1975 | Cavallo | 128/204.21 X |
| 3,952,739 | 4/1976 | Cibulka | 128/204.23 |
| 3,974,828 | 8/1976 | Bird | 128/204.25 |
| 4,020,834 | 5/1977 | Bird | 128/204.25 |
| 4,181,243 | 1/1980 | Frahm | 137/550 X |
| 4,340,044 | 7/1982 | Levy et al. | 128/204.21 |
| 4,387,736 | 6/1983 | Major | 137/550 |

FOREIGN PATENT DOCUMENTS

| | | | |
|---|---|---|---|
| 0092839 | 11/1983 | European Pat. Off. | |
| 1073745 | 9/1954 | France | 137/505.42 |
| 2210428 | 7/1974 | France | |
| 863961 | 3/1961 | United Kingdom | |

*Primary Examiner*—John Rivell
*Attorney, Agent, or Firm*—Lee C. Robinson, Jr.

[57] ABSTRACT

A pressure reducer, especially adapted for the supply of very pure gas in the electronics industry, which comprises a final stage having an inlet, pressure-reducing means and a low-pressure outlet. A filter having a filtration threshold lower than a micron is interposed between the pressure-reducing means and the low pressure outlet.

6 Claims, 1 Drawing Sheet

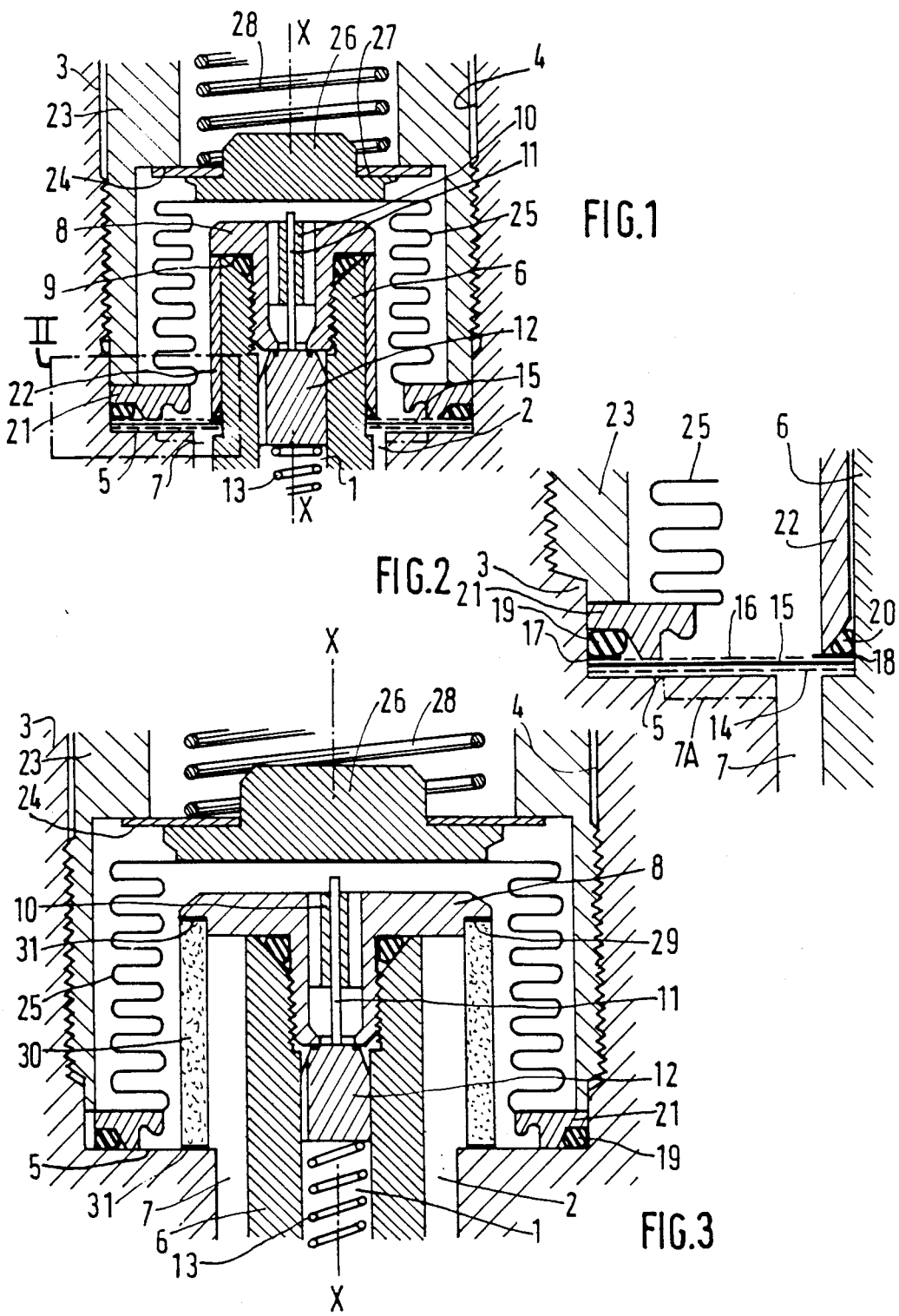

PRESSURE REDUCER FOR PURE GASES

The present invention relates to a pressure reducer for very pure gases of the type compromising a final stage having an inlet, pressure-reducing means and a low pressure outlet.

For the use of pure gases requiring a minimum content of particles, there is usually employed a filtration device placed above the point of utilization (pre-filter and filter). In some fields, in particular the electronics field, it is however necessary to have available a "clean line" (equipment and piping), which improves the reliability of the installation supplied with pure gas. This supply may be from a compressed gas cylinder provided with a valve. A pressure reducer is connected to the outlet of such a cylinder for reducing the pressure of the gas contained in the cylinder to a low pressure level suitable for the envisaged use. Now, the number of solid particles carried along by the stream of gas issuing from such a cylinder may be high and is difficult to control; it is therefore particularly desirable to have available a pressure reducer which permits filtering out substantially all of these particles.

An object of the present invention is to provide a pressure reducer of particularly simple design which attains a very low filtration threshold.

The invention therefore provides a pressure reducer of the aforementioned type which comprises a filter having a filtration threshold lower than a micron interposed between the pressure-reducing means and the low pressure outlet.

Advantageously, the downstream side of the filter communicates, on one hand, with the low pressure outlet, and, on the other hand, with a pipe connected to a pressure gauge.

The filter may be constructed in the form of a diaphragm sandwiched between a support grille and a back-pressure grille, or in the form of a ceramic tube.

Two embodiments of the present invention will be described hereinafter by way of non-limiting examples with reference to the accompanying drawing in which:

FIG. 1 is a partial axial sectional view of the final stage of a pressure reducer according to the invention;

FIG. 2 is a similar view to an enlarged scale of the rectangle II of FIG. 1, and FIG. 3 is a partial axial sectional view of another embodiment of the pressure reducer according to the invention.

Shown in FIGS. 1 and 2 is the second stage of a pressure reducer having two stages supplied by a cylinder of gas under high pressure, for example nitrogen at an initial pressure of 200 bars.

The first stage of the pressure reducer, not shown, is of conventional design and provided with one or more pre-filters at its inlet and outlet; it delivers at the inlet 1 of the second stage the gas under a medium pressure, for example a few tens of bars. The function of the second stage is to again reduce the pressure of the gas from the medium pressure and to deliver at its outlet 2 gas substantially devoid of particles under the desired low pressure of utilization which is, for example, on the order of a few bars. The outlet 2 is connected to a "clean line" (not shown) leading to a point of utilization.

The second stage of the pressure reducer, having an axis X—X assumed to be vertical, comprises a body 3 defining a cylindrical cavity 4 having a horizontal bottom wall 5.

A nozzle 6, defining the inlet 1, projects from the bottom wall 5. Two ducts, namely the outlet 2 and a duct 7 leading to a low-pressure pressure gauge, are provided in the bottom wall 5 close to the base of the nozzle 6.

A plug 8 is screwed into the outlet of the nozzle 6 with interposition of an annular sealing element 9. This plug has a central bore in which is positioned a guide 10 for a freely slidable rod 11. A valve 12, splined on its peripherary and guided by the inlet 1 of the nozzle, is biased into sealing engagement with the lower surface of the plug 8 under the action of a spring 13.

As can be seen more clearly in FIG. 2, three washers are stacked on the bottom wall 5 and extend from the nozzle 6 to the lateral wall of the cavity 4: a back-pressure lower grille 14, a filtering diaphragm 15 of polymeric material, for example TEFLON polymeric material (TEFLON is a trademark for synthetic resin polymers and products), and a support grille 16. A band 17 of TEFLON polymeric material is placed on the outer peripheral portion of the grille 16 and, preferably, another band 18 of "Teflon" is placed on the inner peripheral portion of this grille, as shown. An annular sealing element, 19, 20 is pressed against each band 17, 18 by an annular member 21, 22 respectively.

The outer member 21 is a ring maintained in position by a tubular nut 23 screwed in the cavity 4 and having an inner shoulder 24 (FIG. 1) above the nozzle 6. Set on the inner peripheral portion of the ring 21 is the lower end of a bellows 25 whose upper end is closed by a cover 26 which carries a washer 27 biased downwardly by a spring 28.

The inner member 22 is a sleeve mounted on the nozzle 6 and maintained in position by a peripheral portion of the plug 8.

In service, when the reduced pressure prevailing in the bellows is sufficient, the washer 27 is applied against the shoulder 24, as shown, and the rod 11 is free. The valve 12 is then closed. As soon as this pressure drops below the set value, the spring 28 becomes predominant and the cover 26 descends and urges the rod 11 downwardly, which opens the valve 12. The gas at medium pressure entering via the duct at 1 is thus delivered to the outlet 2 and to the pressure gauge duct 7 under the same regulated low pressure of utilization after having passed through the inner space of the bellows and then through the filtering diaphragm.

Owing to the presence of the diaphragm 15, which has typically a filtration threshold of about 0.1 micron, the outgoing gas is substantially devoid of particles.

By way of a modification, as shown in dot-dash lines 7A in FIG. 2, the ducts 2 and/or 7 may be enlarged in the vicinity of the bottom wall 5 in order to increase the effective area of the diaphragm 15. This enlargement is however limited by the resulting weakening of the support of the diaphragm.

The embodiment shown in FIG. 3 is on the whole identical to that of FIGS. 1 and 2, except for the following differences: the elements 14 to 18, 20 and 22 are eliminated so that the ring 21 bears directly against the bottom wall 5; the plug 8 is wider and has a peripheral recess 29; a tubular section 30 of ceramic having a filtration threshold of about 0.1 micron, is centered in the recess 29 and bears against the bottom wall 5 outside the ducts 2 and 7. Flat sealing gaskets 31 are provided at the ends of the filter 30 and, preferably, the end regions of this filter are glazed in order to eliminate porosity and consequently provide a good seal.

In service, the medium pressure gas has its pressure reduced, as before, in the inner space of the bellows, then passes through the filter 30 from the exterior to the interior and reaches, at the same low pressure of utilization, the ducts 2 and 7, substantially devoid of particles.

We claim:

1. A pressure reducer comprising an axial tubular part defining an axial inlet, an annular outlet concentric with the inlet, a bellows surrounding the axial tubular part and defining an annular volume communicating with the outlet, an inlet valve biased closed within the tubular part, and a filter disposed between the bellows and the outlet.

2. A pressure reducer according to claim 1, wherein the filter has a filtration threshold on the order of 0.1 micron.

3. A pressure reducer according to claim 1, wherein the filter comprises a support grille, a back-pressure grille, and a filtering diaphragm sandwiched between the support grille and the back-pressure grille.

4. A pressure reducer according to claim 1 wherein the filter comprises a filtering tube of ceramic.

5. A pressure reducer comprising a body, a final stage having an inlet, pressure-reducing means, a low pressure outlet, a ceramic filtering tube having a filtration threshold lower than a micron interposed between the pressure-reducing means and the low pressure outlet, said body including an axial tubular part, which tubular part of said body defines said inlet, a pressure-reducing valve within said tubular part of said body, and a bellows surrounding said axial tubular part of said body and defining with said axial tubular part of said body an annular volume communicating with the low pressure outlet.

6. A pressure reducer comprising a tubular part defining an inlet, a low pressure outlet, a filter having a filtration threshold lower than a micron interposed between the tubular part and the low pressure outlet, a pressure-reducing valve within said tubular part, and a bellows disposed around said pressure-reducing valve and defining with said tubular part an annular volume communicating with the low pressure outlet.

* * * * *